United States Patent [19]

Kennedy et al.

[11] Patent Number: 5,605,748
[45] Date of Patent: Feb. 25, 1997

[54] FIBER BEDS FOR FIBER BED MIST ELIMINATORS

[75] Inventors: Eugene D. Kennedy, Maryland Heights; John S. Merz, Florissant; Prabhakar D. Paranjpe; Albert E. Tung, both of Chesterfield, all of Mo.

[73] Assignee: Monsanto Enviro-Chem Systems, Inc., St. Louis, Mo.

[21] Appl. No.: 183,673

[22] Filed: Jan. 19, 1994

Related U.S. Application Data

[63] Continuation-in-part of Ser. No. 7,717, Jan. 22, 1993, abandoned.

[51] Int. Cl.$^6$ .................................................. D04H 11/00
[52] U.S. Cl. ........................... 442/5; 428/112; 428/113; 428/109; 428/303; 55/242; 55/486; 55/489; 55/497; 55/510; 55/527; 210/315; 210/496; 210/505; 210/508; 210/488; 210/491; 442/24
[58] Field of Search ........................ 55/96, 242, 486, 55/498, 187, 487, 488, 489, 510, 524, 527, 528; 428/357, 300, 301, 112, 113, 109, 294, 297, 303; 210/315, 419, 496, 483, 503, 505, 506, 508, 489, 488, 490, 491, 492

[56] References Cited

U.S. PATENT DOCUMENTS

| | | |
|---|---|---|
| Re. 33,023 | 8/1989 | Hiers ........................................ 428/285 |
| 3,107,986 | 10/1963 | Plaut et al. ................................ 55/97 |
| 3,135,592 | 6/1964 | Fairs et al. ................................ 55/90 |
| 3,540,190 | 11/1970 | Brink, Jr. .................................. 55/97 |
| 3,975,565 | 8/1976 | Kendall .................................... 428/284 |
| 4,053,290 | 10/1977 | Chen et al. ............................... 55/187 |
| 4,086,070 | 4/1978 | Argo et al. ............................... 55/97 |
| 4,093,437 | 6/1978 | Ichihara et al. . | |
| 4,120,671 | 10/1978 | Steinmeyer ............................... 55/96 |
| 4,144,040 | 3/1979 | Claes et al. .............................. 55/97 |
| 4,155,726 | 5/1929 | Steinmeyer ............................... 55/242 |
| 4,211,661 | 7/1980 | Perry . | |
| 4,249,918 | 2/1981 | Argo et al. ............................... 55/97 |
| 4,267,626 | 5/1981 | Terry ....................................... 29/163.5 |
| 4,564,377 | 1/1986 | Kocatas .................................... 55/488 |
| 4,818,257 | 4/1989 | Kennedy et al. ........................ 55/97 |
| 4,915,714 | 4/1990 | Teague et al. ........................... 55/486 |
| 4,948,398 | 8/1990 | Thomaides et al. ..................... 55/97 |
| 5,045,094 | 9/1991 | Paranjpe .................................. 55/97 |

FOREIGN PATENT DOCUMENTS

| | | |
|---|---|---|
| 2028229 | 3/1980 | European Pat. Off. . |
| 0417364 | 3/1991 | European Pat. Off. . |
| 0417364A1 | 3/1991 | European Pat. Off. ........ B01D 39/16 |
| 2621592 | 11/1977 | Germany ...................... D04H 13/00 |

OTHER PUBLICATIONS

Monsanto Enviro-Chem Systems, Inc., "Brink Mist Eliminators", (1990).

Fairs, Lowrie G., "High Efficiency Fibre Filters for the Treatment of Fine Mists", Trans. Instn. Chem. Engrs., vol. 36, pp. 476–485, (1958).

Primary Examiner—Merrick Dixon
Attorney, Agent, or Firm—Senniger, Powers, Leavitt & Roedel

[57] ABSTRACT

There is provided a fiber bed for removing liquid aerosols and soluble solids from a gas stream in a fiber bed mist eliminator. The fiber bed is in the form of a flexible mat having a void fraction of greater than about 0.89 and greater than about 700 net collection targets. The mat includes a layer of collecting fibers having an average fiber diameter between about 1 and about 5 μm. The collecting fibers are stabilized by a plurality of stabilizing fibers which penetrate into and are disposed interstitially within the collecting fiber layer. The improved fiber bed of the present invention is field-replaceable and, by utilizing fibers having a small average diameter, the thickness of the fiber bed may be reduced.

17 Claims, 4 Drawing Sheets

FIBER BEDS FOR FIBER BED MIST ELIMINATORS

This application is a continuation-in-part of Ser. No. 007,717, filed Jan. 22, 1993, now abandoned.

This invention relates to improved fiber beds for fiber bed mist eliminators and processes for removing liquid aerosols and soluble solids from gas streams using those fiber beds.

BACKGROUND OF THE INVENTION

Fiber bed mist eliminators have found wide industrial application in the removal of aerosols from gas streams. Some of the more frequent applications include removal of acid mists, such as sulfuric acid mists, in acid manufacturing, removal of plasticizer mists in the manufacture of polyvinyl chloride floor or wall coverings and removal of water soluble solid aerosols from the emissions of ammonium nitrate prill towers. In these various applications, fiber bed mist eliminators may achieve separation efficiencies of 99% or greater.

It is generally known that fibers made of various materials may be utilized to construct fiber beds for fiber bed mist eliminators. The fiber bed is designed to collect fine liquid mist and soluble solid particles entrained in a moving gas stream and drain them through the structure of the bed. Typically, beds of collecting fibers are associated with metal wire screens or similar external support structures. The combination of a bed of collecting fibers and external support structure is known as a fiber bed element. As used hereinafter, fiber bed refers to that portion of the fiber bed element apart from any such support structure. Fiber beds may be formed by packing bulk fiber between two opposing support screens (bulk-packed beds) or winding a roving made of fibers around a cylindrical support screen (wound beds). Although not limited to such a configuration, fiber bed elements are most often configured in the form of a substantially vertical cylinder. Cylindrical fiber bed elements permit a high effective fiber bed surface area in a minimum of space. Flat fiber bed elements on the other hand, find particular application in high gas velocity applications.

In operation, a substantially horizontal stream of gas containing a liquid or soluble solid aerosol is made to penetrate and pass through the fiber bed of the fiber bed element. The fibers in the fiber bed capture the aerosol in the gas by the mechanisms of impaction, interception, and Brownian diffusion. The captured aerosol coalesces on the fibers to form droplets of liquid in the fiber bed. The moving gas urges the droplets to move toward the downstream face of the fiber bed where the captured liquid exits the fiber bed and drains downward under the force of gravity.

The fibers which comprise the fiber bed may be made from a variety of materials. Materials utilized to make bed fiber include, for example, metals such as stainless steel, titanium, etc., fibers of polymeric materials such as polyesters, polyvinylchloride, polyethylene terphthalate, nylons, polyethylene, polypropylene etc., and glass. In applications where corrosive conditions and/or high temperatures are encountered, chemical grade glass fibers have found particularly widespread use in fiber beds of fiber bed mist eliminators.

Fibers ranging in diameter from 5 μm or less to more than 200 μm, as well as combinations of fibers of varying diameters, have been utilized in fiber beds. The bulk density of prior art fiber beds ranges from about 5 lb/ft$^3$ to greater than 20 lb/ft$^3$, while fiber bed thickness ranges from about 0.5 to about 4 inches or more, depending upon the desired separation efficiency.

In order for a fiber bed to function effectively, the bed must be mechanically stable. A mechanically stable fiber bed is one which will retain its structural integrity without substantial shifting of the fibers relative to adjacent fibers when exposed to the forces exerted by the gas being treated and the captured and draining liquid during aerosol collection. If mechanical stability is not maintained the performance characteristics of the bed will be unfavorably altered. In a fiber bed lacking mechanical stability, the moving gas stream forces the fibers to shift substantially, causing the liquid ladened fibers in some portions of the fiber bed to mat or felt while increasing the void space between adjacent fibers in other portions of the fiber bed. Matted portions of the fiber bed are more resistant to both the flow of gas and the drainage of captured liquid. Captured liquid which is unable to drain is often reentrained by the moving gas stream, resulting in reduced separation efficiency. Also, the pressure drop across matted portions of an unstable fiber bed is increased. On the other hand, in those portions of a mechanically unstable fiber bed where fiber shifting has increased the average void space between adjacent fibers, macroscopic pores or channels form which reduce separation efficiency by allowing the aerosol containing gas to pass through the fiber bed without sufficient contact with the collecting fibers.

In bulk-packed and wound fiber bed elements, mechanical stability is largely dependent upon the bulk density of the fiber bed. In these conventionally constructed fiber bed elements, a fiber bed bulk density within the range disclosed by the prior art typically provides sufficient contact between adjacent fibers to prevent substantial movement of the fibers when exposed to the forces exerted by the moving gas stream. In bulk-packed fiber beds, density of the fiber bed and resistance to fiber movement is maintained by the reactive compressive force applied against the packed fibers by the two opposing support screens. In wound fiber beds, density of the fiber bed necessary to provide mechanical stability is a result of several factors including the tension in the roving as it is wound around the cylindrical support screen and compression of the fiber bed by a wire screen or similar structure which may be wound on the cylinder adjacent to the exterior surface of the fiber roving.

However, bulk density cannot be increased indiscriminately to achieve mechanical stability. If the bulk density of a fiber bed is increased too much, the bed will be prone to flooding. An effective fiber bed is a relatively open structure that allows free gas flow and liquid drainage even when the collecting fibers are coated with collected liquid. There must be sufficient void space between adjacent fibers in the bed so that collected liquid is not able to bridge the space between adjacent fibers to such an extent that the adherence of collected liquid to the surface of fibers prevents the liquid from draining.

A measure of the open space in a fiber bed is void fraction which is defined by the bulk density of the fiber bed and the average density of the fiber material according to the following formula:

$$\text{fiber bed void fraction} = 1 - \left[ \frac{\text{fiber bed bulk density}}{\text{average fiber material density}} \right]$$

Fiber beds typically have a void fraction of greater than about 0.89.

It is generally known that the thickness of a fiber bed can be decreased without a loss in separation efficiency by decreasing the average fiber diameter of the fiber material comprising the fiber bed. However, for bulk-packed and wound fiber beds comprised of fibers having an average diameter of less than about 5 μm, when the bulk density is high enough to ensure mechanical stability, the resulting void fraction is so low that the bed tends to flood under typical operating conditions. A flooded bed is a fiber bed in which captured liquid substantially fills the void spaces between adjacent fibers in the fiber bed. A flooded fiber bed is much like the matted portions of an unstable fiber bed. The captured liquid in a flooded fiber bed can not properly drain and instead may be reentrained in the moving gas stream at the downstream face of the fiber bed. Furthermore, the pressure drop across a fiber bed element is increased when the fiber bed is flooded. If a pressure differential across the fiber bed sufficient to overcome the force of adhesion and dislodge the collected droplets from the fibers is employed, the collected liquid is blown from the downstream face of the fiber bed where it is reentrained by the gas stream resulting in low separation efficiency and increased operating cost.

In order to prevent a fiber bed comprised of small average diameter fibers from flooding, the specific fiber surface area, expressed as the area of fiber per unit volume of the fiber bed, may be decreased by decreasing the bulk density of the bed (i.e., increasing the void fraction). However, if the bulk density of a bulk-packed or wound fiber bed comprised of fibers having an average diameter less than about 5 μm is reduced to a value sufficient to avoid flooding, such fiber beds lack the mechanical stability necessary to withstand the forces exerted by the moving gas stream. As a result, the moving gas stream causes the fibers to shift substantially resulting in the fiber bed matting and/or channeling as previously described. Therefore, in practice, conventionally constructed high efficiency fiber bed elements comprise fiber beds 2 to 4 inches thick constructed of fibers having an average fiber diameter between 5 and 15 μm and having a bulk density between 5 and 15 lb/ft$^3$.

In contrast to fiber beds used in mist eliminators, some other types of gas filters, such as baghouse, clean room and breathing filters, may successfully utilize glass fibers with average diameters below 5 μm and may even include fibers having a diameter less than 1 μm. However, these types of gas filters are distinguished from fiber bed mist eliminators in that they are typically designed to utilize pore and surface filtration in collecting solid particulates or only relatively small amounts of liquid aerosols. If used to collect liquid aerosols, they easily flood at the liquid loading rates typically encountered in fiber bed mist eliminators. By comparison, fiber bed mist eliminators are designed to allow comparatively large quantities of liquid entrained in a moving gas stream to penetrate the fiber bed where the liquid is captured and continuously drained. Therefore, a solution to the problems associated with utilizing small diameter fibers in fiber beds of fiber bed mist eliminators is neither shown nor suggested by the prior art concerned with such other gas filters.

Reentrainment of collected liquid by the moving gas stream at the downstream face of a fiber bed is often a problem in fiber bed mist eliminator applications, especially in operations characterized by high liquid loading rates or high gas stream velocities. Satisfactory solutions to this problem have included combining a layer of primary filtration fibers and a layer of drainage fibers to form a fiber bed. The drainage layer is downstream of the primary filtration layer and usually comprised of fibers with a larger average diameter than those fibers comprising the primary filtration layer.

Despite their success, fiber bed elements of the prior art have several disadvantages resulting from shortcomings in the fiber bed. Conventionally constructed fiber bed elements include substantial external support structures of metal, fiberglass, polypropylene, etc. necessary to maintain a fiber bed bulk density sufficient to provide mechanical stability. A fiber bed element containing a bulk-packed fiber bed must include two opposing support screens substantial enough to retain the fibers in compression and thereby maintain fiber bed density. Wound fiber bed elements must contain a cylindrical support structure able to withstand the forces exerted by the roving during manufacture of the fiber bed element. Furthermore, because conventional fiber beds do not have form absent the external support structure of the fiber bed element, such support structure is needed in both bulk-packed and wound fiber bed elements to hold the fiber bed in the desired configuration. The need for substantial external support structure is a cost disadvantage which in many instances is worsened by the fact that the structure must be made from expensive corrosion resistant materials such as stainless steel alloys and high performance fiberglass resins.

Another disadvantage associated with bulk-packed and wound fiber bed elements is the need to remove the elements from the mist eliminator and return them to the manufacturer when the fiber bed needs replacement. Aside from the inconvenience of transporting the heavy support structure, an interchangeable spare fiber bed element must be available for the fiber bed mist eliminator to be returned to service and avoid extensive down time. Field replacement of the fiber bed is hampered by difficulties in assembling the fiber bed. Considerable skill and time are required to properly pack new bulk fiber between opposing support screens so that inhomogeneities in the fiber bed are avoided, while winding fiber onto a cylindrical support structure requires extensive machinery. Precast fiber bed sections have been used by some manufacturers but these have suffered from leakage at joints or settling.

A third disadvantage is that because fibers having an average fiber diameter of less than about 5 μm can not be used effectively in constructing a conventional fiber bed, fiber bed thickness in applications requiring high separation efficiency can not be reduced. If thinner high efficiency fiber beds were possible, fiber beds could be configured into shapes that maximize the fiber bed surface area in a given volume available for a fiber bed mist eliminator. This would be analogous to the dry filter art where thin filter papers and felts allow high surface area filter forms via pleating. Thinner, high efficiency fiber beds having increased fiber bed surface area would allow the operating cost of fiber bed mist eliminators to be decreased by decreasing the pressure drop across the fiber bed.

SUMMARY OF THE INVENTION

Among the several objects of the invention may be noted the provision of an improved fiber bed for high efficiency fiber bed mist eliminator applications; the provision of a fiber bed comprising fibers having a smaller average diameter than was previously believed practicable yet which is mechanically stable under design operating conditions without flooding; the provision of a thinner high efficiency fiber bed which increases the effective fiber bed surface area available in a given fiber bed mist eliminator volume and reduces the pressure drop; the provision of a field-replaceable fiber bed in the form of a flexible mat having textile-like qualities such that the fiber bed can be cut into a desired pattern, sewed and easily manipulated; the provision of a fiber bed element in which the extent or substantiality of the external support structure can be reduced and simplified; and the provision of an improved process for removing liquid aerosols and soluble solids from a moving stream of gas which utilizes a field-replaceable fiber bed in the form of a mat.

Briefly, therefore, the present invention is directed to a field-replaceable fiber bed for use in a fiber bed mist eliminator for removing aerosols and soluble solids from a moving gas stream. The fiber bed is in the form of a flexible mat having a void fraction of greater than about 0.89 and greater than about 700 net collection targets. The mat comprises a layer of collecting fibers having an average fiber diameter between about 1 µm and about 5 µm. The mat further comprises a plurality of stabilizing fibers for positionally stabilizing the collecting fibers of the mat. The stabilizing fibers penetrate into and are disposed interstitially within the collecting fiber layer such that the stabilizing fibers extend into the collecting fiber layer in the thickness direction thereof and in a direction generally parallel to the direction of gas flow through the mat. The number of stabilizing fibers and the extent to which they penetrate into the collecting fiber layer is sufficient so that the collecting fibers are mechanically stable under design operating conditions.

The invention is further directed to a fiber bed element which includes the fiber bed of the present invention. In addition to a field-replaceable fiber bed in the form of a mat as previously described, the fiber bed element further comprises a fiber bed support and a fiber bed securing means. The extent and substantiality of this external support structure is reduced and simplified as compared to the external support structure of bulk-packed and wound fiber bed elements of the prior art.

The invention is further directed to an improved process for removing liquid aerosols and soluble solids from a moving stream of gas in a fiber bed mist eliminator. The process comprises causing the gas to be treated to flow substantially horizontally through the field-replaceable fiber bed of the present invention so as to collect and drain the entrained aerosols.

Other objects and features of the present invention will become more apparent after a consideration of the following detailed specification and claims taken in conjunction with the accompanying drawings.

BRIEF DESCRIPTION OF THE DRAWINGS

Corresponding reference numerals designate corresponding parts throughout the various embodiments shown in the drawings.

DETAILED DESCRIPTION OF THE INVENTION

In accordance with the present invention, a fiber bed for use in a fiber bed element of a fiber bed mist eliminator is provided. The fiber bed is field-replaceable and is in the form of a flexible mat. By field-replaceable it is meant that, unlike conventional bulk-packed and wound fiber beds, the fiber bed of the present invention is assembled apart from the external support structure of a fiber bed element. Thus, when a fiber bed of the invention is employed, the element does not have to be removed from the mist eliminator site for the fiber bed to be replaced as is typically required in the case of conventional fiber beds.

Figures 1, 2:
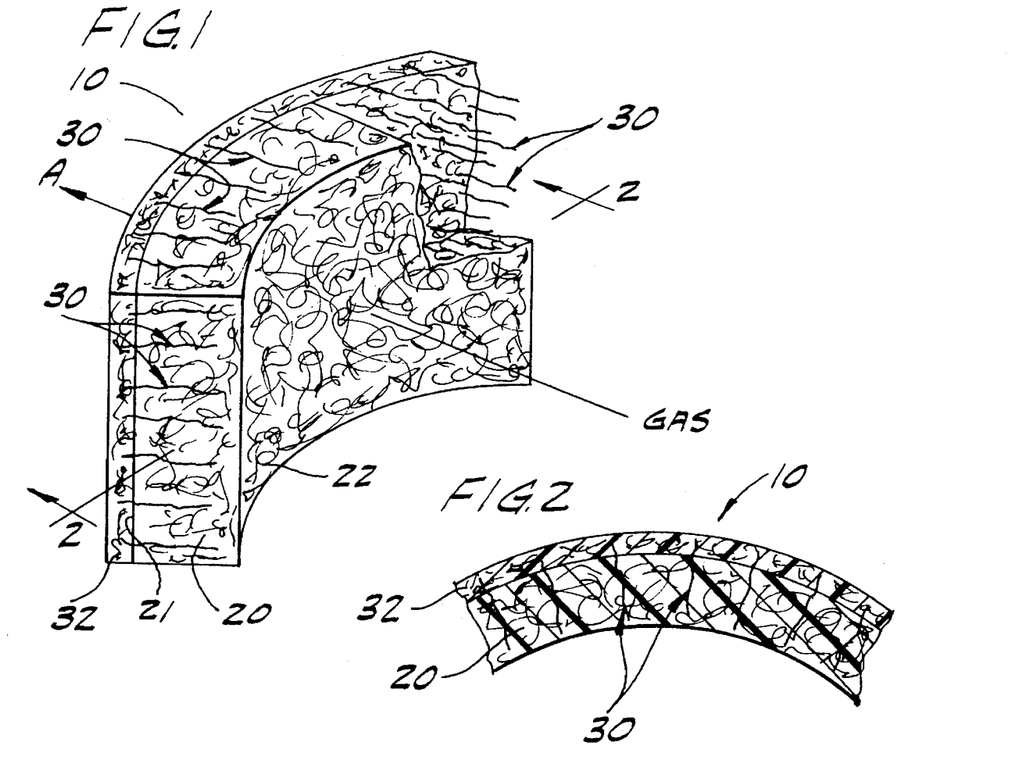
FIG. 1 is a fragmentary perspective view of a cylindrically configured fiber bed in accordance with one embodiment of the invention with part broken away to show the stabilizing fibers.
FIG. 2 is a cross-sectional view of the fiber bed fragment shown in FIG. 1 taken along line 2—2.

In FIG. 1, a fragment of a cylindrically configured mat in accordance with one embodiment of the fiber bed of the present invention is shown and is generally designated by reference numeral 10.

Mat 10 comprises a collecting fiber layer 20 having a first face 21 and a second face 22. The collecting fiber layer 20 is the primary aerosol collection media and is comprised of fibers having a smaller average diameter than previously believed practicable. The average diameter of the fibers comprising the collecting fiber layer 20 is between about 1 µm and about 5 µm. The fibers comprising the collecting fiber layer 20 may be made from a variety of materials known in the art, including glass as well as polymeric materials such as polyester or polypropylene. Preferably, especially when corrosion resistance is important (e.g., acid mist removal applications), the collecting fiber layer 20 is comprised of chemical grade glass fibers.

If glass fibers are selected to comprise the collecting fiber layer 20, the collecting fiber layer is preferably one or more laid batts or plies of fiber glass filament sold under the product designation B010 which is commercially available from Schuller Corporation, Denver, Colo. Fiber glass filament B010 has an average fiber diameter between 2.5 and 3.8 µm. Batts of fiber glass filament B010 have a density of approximately 1 lb/ft$^3$ and are approximately 1 inch thick prior to assembly of mat 10. Assembly of the mat is described below.

Although not required by the present invention, it is preferred that the collecting fiber layer 20 be comprised of fibers of varying diameter as opposed to consisting only of fibers having diameters essentially equivalent to the average fiber diameter. For example, fiber glass filament B010 is comprised of glass fibers ranging in diameter from about 0.3 µm to about 15 µm. Such a range of fiber diameters has been found to impart superior drainage characteristics in the collecting fiber layer 20.

The fiber bed of the present invention further comprises a plurality of stabilizing fibers 30 for positionally stabilizing the collecting fibers of the collecting fiber layer 20 during aerosol collection. The stabilizing fibers 30 penetrate into and are disposed interstitially within the collecting fiber layer 20. The stabilizing fibers 30 extend into and/or through the collecting fiber layer 20 in the thickness direction thereof and in a direction generally parallel to the direction of gas flow through mat 10. The direction of gas flow in FIG. 1 and in subsequent drawings is indicated by arrow A. In FIG. 1, a portion of the collecting fiber layer 20 has been broken away to show the stabilizing fibers 30. FIG. 2 is a cross-sectional view of mat 10 taken along line 2—2 in FIG. 1 which also shows the stabilizing fibers 30 penetrating into and disposed interstitially within the collecting fiber layer 20.

Mechanical stability of the collecting fiber layer 20 is not achieved by maintaining a high bulk density in mat 10, but is provided primarily by the stabilizing fibers 30. The stabilizing fibers 30 make possible the use of fibers having an average fiber diameter less than about 5 Bm in the collecting fiber layer 20 by ensuring the collecting fibers are mechanically stable at a fiber bed bulk density sufficiently low to avoid flooding. The stabilizing fibers 30 contact the fibers of the collecting fiber layer 20 along the length of the stabilizing fibers. The physical restraint resulting from this engagement, which may include entanglement of the stabilizing fibers 30 with the fibers of the collecting fiber layer 20, prevents the fibers of the collecting fiber layer from moving substantially in relation to adjacent fibers both in the direction of gas flow and in a plane perpendicular to gas flow. As a result, the fibers of the collecting fiber layer 20 are substantially retained in position during aerosol collection without matting and/or forming channels. It should be understood that to impart the desired mechanical stability, the stabilizing fibers 30 do not need to be very straight or very parallel to the direction of gas flow through mat 10. In practice, the straightness and orientation of individual stabilizing fibers 30 may vary considerably.

The number of stabilizing fibers 30 and the extent to which the stabilizing fibers penetrate into the collecting fiber layer 20 must be sufficient so that the collecting fiber layer is mechanically stable under design operating conditions. Typically, this requires several hundred stabilizing fibers 30 per square inch of the collecting fiber layer 20 penetrating substantially through the collecting fiber layer. However, both the number of stabilizing fibers 30 and the extent of penetration into the collecting fiber layer 20 may vary so long as the collecting fiber layer 20 is mechanically stable.

The stabilizing fibers 30 are long enough to allow sufficient penetration into the collecting fiber layer 20 and preferably have a larger average fiber diameter than the collecting fibers such that the ratio of the average fiber diameter of the stabilizing fibers to the average fiber diameter of the collecting fibers is at least about 2:1, preferably at least about 4:1. Larger diameter fibers are preferred because they are physically stronger and serve to impart strength to the mat. This strength is especially important as mat 10 is handled after assembly in pattern cutting, sewing and transportation prior to installing the mat in a fiber bed element. The average diameter of the stabilizing fibers 30 will preferably be between about 15 μm and about 20 μm.

The stabilizing fibers 30, may be comprised of various conventional fiber materials including metals such as stainless steel, titanium, etc., as well as fibers of polymeric materials such as polyesters, acrylics, polyamides, polyvinylchloride, polyethylene terphthalate, nylons, polyethylene, polypropylene, and tetrafluoroethylene polymer. The material selected is dependent upon the chemical resistance requirements for a particular fiber bed mist eliminator applications.

Mat 10 of the present invention is assembled so as to have a void fraction of greater than about 0.89. Although the average density of the fiber materials in mat 10 can vary over a considerable range depending upon the type of fiber materials utilized in the collecting fiber layer 20 and as stabilizing fibers 30, it is important that the void fraction of mat 10 be greater than about 0.89 in order to provide a fiber bed which allows the collected liquid aerosol to drain from the fiber bed without flooding.

Void fraction is not, however, a total index for describing the properties of mat 10 necessary to achieve the performance characteristics which are provided by the fiber bed of this invention. Another index of the performance of a fiber bed that characterizes aerosol collection capabilities is the "net collection targets" or NCT of the fiber bed. The NCT of a fiber bed is defined as the product of the specific fiber surface area of the bed and the bed thickness. In effect, NCT provides an indication of the amount of fiber surface area "seen" by the aerosol ladened gas as it flows through a fiber bed. Generally, a higher NCT value is desired in high efficiency fiber bed applications as it indicates greater availability of fiber surface area for collection of small diameter aerosol particles by the mechanism of Brownian diffusion. Mat 10 is constructed so as to have an NCT greater than about 700.

Once the fiber materials to be used as the collecting fibers and the stabilizing fibers 30 have been selected, an iterative calculation scheme may be employed in order to ensure that a proposed mat of the present invention will achieve the desired efficiency and satisfy the minimum void fraction and NCT requirements.

Initially, an overall thickness for a proposed mat and complementary weight fractions of the materials to be incorporated into the mat to form the collecting fibers and stabilizing fibers are selected. The selected thickness of a proposed mat is dependent upon the amount of fiber used to form the collecting fiber layer 20 which, in turn, depends upon the desired separation efficiency as well as the average fiber diameter of the fiber material to be used in the collecting fiber layer (i.e., between about 1 μm and about 5 μm). Generally, it is desirable to minimize the pressure drop across the fiber bed for a given separation efficiency in order to minimize power requirements. Therefore, the selected thickness of a proposed mat should be no more than what is required to provide the minimum acceptable separation efficiency. Selecting a fiber bed thickness capable of achieving a desired separation efficiency is well within the capability of those skilled in the art. By utilizing fibers having an average fiber diameter less than about 5 μm in the collecting fiber layer 20, the present invention allows the thickness of mat 10 to be substantially reduced in a particular mist eliminator application as compared to an equally effective conventional fiber bed of the prior art.

Whether the proposed mat will have a void fraction greater than about 0.89 is then determined according to the following formula:

$$\text{mat void fraction} = 1 - \left[ \frac{\text{bulk density}}{\text{average material density}} \right] \quad \text{(I)}$$

As used in formula (I), "bulk density" is the sum of the material weights (expressed in weight per unit area) of the fiber materials to be used as collecting fibers and as stabilizing fibers divided by the selected thickness of the mat. Furthermore, "average material density" is the sum of the product of each selected weight fraction and the density of the corresponding fiber material.

Whether the proposed mat will satisfy the minimum NCT requirement is determined by first calculating the specific fiber surface area (SFSA) of the mat according to the following formula:

$$SFSA = \frac{4 \times (1 - \text{mat void fraction})}{\text{average fiber diameter}} \quad (II)$$

As used in formula (II), "average fiber diameter" is the inverse of the sum of the quotients of each selected weight fraction and the average fiber diameter of the corresponding fiber material. The resulting value of SFSA is then multiplied by the selected thickness to determine NCT of the proposed mat.

If the calculated values for void fraction and NCT of the proposed mat are not greater than 0.89 and 700, respectively, the selected mat thickness and/or weight fractions or both should be adjusted accordingly. The calculations for efficiency, void fraction and NCT are then repeated until, through trial and error, suitable thickness and weight fraction values are determined.

Assembly of mat 10 may be accomplished by any means capable of disposing the stabilizing fibers 30 interstitially within the collecting fiber layer 20 such that the fibers of the collecting fiber layer 20 are mechanically stable under design operating conditions and the void fraction and NCT requirements of mat 10 are achieved. Generally, this requires a consolidation or densification of the fiber material used to form the collecting fiber layer 20 accompanied by placement of the stabilizing fibers 30 in the collecting fiber layer. This can be achieved by placing a layer or web of fibers of the material selected to comprise the stabilizing fibers 30 adjacent to the fiber material selected to comprise the collecting fiber layer 20 and then displacing fibers from the web such that they penetrate into the collecting fiber material and form the stabilizing fibers disposed interstitially within the collecting fiber layer. The preferred method of displacing fibers from the web which serves as the "source" of the stabilizing fibers 30 is by needle-punching. Suitable needle-punching processes are disclosed in Hiers, U.S. Pat. No. Re. 33,023 and Kendall, U.S. Pat. No. 3,975,565, the entire disclosures of which are incorporated herein by reference.

In the Hiers and Kendall patents, consolidated, composite fibrous structures comprising a plurality of interlayered inorganic fiber layers and webs of organic fibers are provided. The various layers are held together over the greater part of their areas by needled fibers originating from at least one of the webs and extending into and/or through one or more of the layers of inorganic fibers in the thickness direction thereof. These composite structures are obtained by layering a relatively thin web of non-woven organic fibers with a layer of non-woven inorganic fibers and needle-punching organic fibers into the layer of inorganic fibers by subjecting the web to the action of a plurality of reciprocating barbed needles which pass through the web and into the layer of inorganic fibers substantially in the thickness direction thereof. In some embodiments, the layer of inorganic fibers is interposed between two webs of organic fibers and the needle-punching operation conducted from both sides of the structure to displace fibers from both webs into the layer of inorganic fibers.

Figure 3:
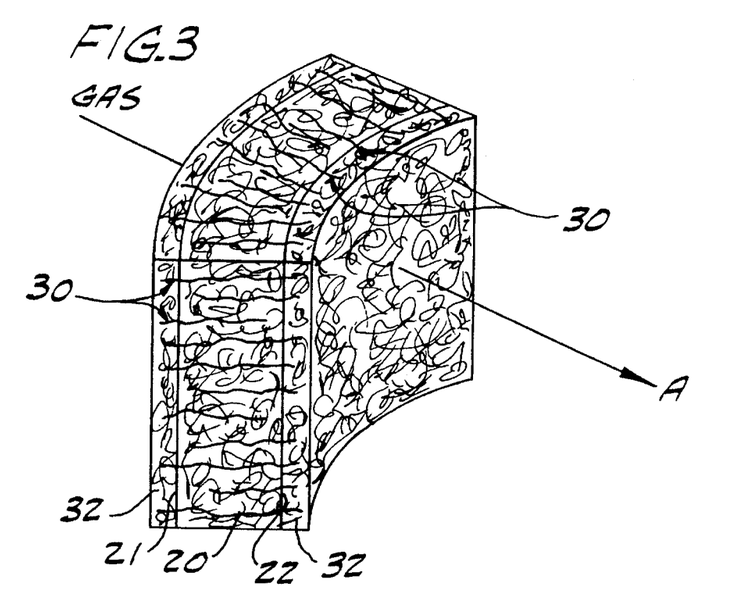
FIG. 3 is a fragmentary perspective view of a cylindrically configured fiber bed in accordance with another embodiment of the invention.

When the preferred needle-punching process is employed to assemble mat 10, the mat may further comprise a residual fiber web 32, as shown in FIGS. 1 and 2, from which the needle-punched stabilizing 30 fibers originate. Thus it should be understood that it is not necessary that the faces of collecting fiber layer 20 be free of the fiber material which serves as the source of the stabilizing fibers 30. Such a residual web 32 may be present due to the fact that in the preferred needle-punching process the web used as the source of the stabilizing fibers 30 may contain a number of fibers greater than the number of fibers needle-punched into the collecting fiber layer 20. Furthermore, if mat 10 is formed by interposing the collecting fiber layer 20 between two source webs and needle-punching the structure from both sides, the mat may comprise a residual fiber web 32 on each face of the collecting fiber layer as shown in FIG. 3. It is to be understood that residual fiber webs 32 are not required by the present invention but that such fibers may be present so long as they cause no substantial increase in pressure drop through the mat.

Preferably, in acid mist removal applications, the stabilizing fibers 30 are a mixture of tetrafluoroethylene polymer fibers and fibers made of polypropylene. Tetrafluoroethylene polymer is preferred in such applications because it resists corrosion by acid aerosols. However, because fibers made of this material are relatively slick, they are hard to consolidate into a source web as is required prior to assembly of mat 10. Therefore, fibers made of tetrafluoroethylene polymer may be blended with fibers made of polypropylene in order to facilitate manufacture of the source web. Fibers made of similar polymeric materials, such as polyester or nylon, may alternatively be blended with tetrafluoroethylene fibers to ease fabrication of the source web. If the stabilizing fibers 30 comprise a blend of tetrafluoroethylene polymer fibers and other polymeric fibers, the weight ratio of the former to the latter disposed in mat 10 is preferably between about 2:1 and about 5:1.

Manufacture of polymer fabrics used as the web of fiber material which serves as the source of the stabilizing fibers 30 is well known. Typically the manufacture of these fabrics involves the steps of (1) fiber blending of fibers made from different materials (2) carding (3) fiber randomizing and (4) web formation. Prior to the assembly of mat 10, the source web is a very high loft, but low density material. However, after assembly of mat 10, the thickness of any residual web 32 is less than about 0.0625 inch and constitutes a relatively small proportion of the thickness of the mat.

Although not shown in FIGS. 1–3, mat 10 lends itself to modifications, as will be more fully described herein, where one or more further layers of fiber or other material are made part of the mat by being interposed between the collecting fiber layer 20 and a source web prior to assembly of the mat such that after assembly the stabilizing fibers 30 pass therethrough. It should be understood that when additional layers are incorporated into the mat 10, such additional layers are ignored for purposes of determining whether the minimum void fraction and NCT requirements of the mat are satisfied.

Figures 4, 4A, 4B:
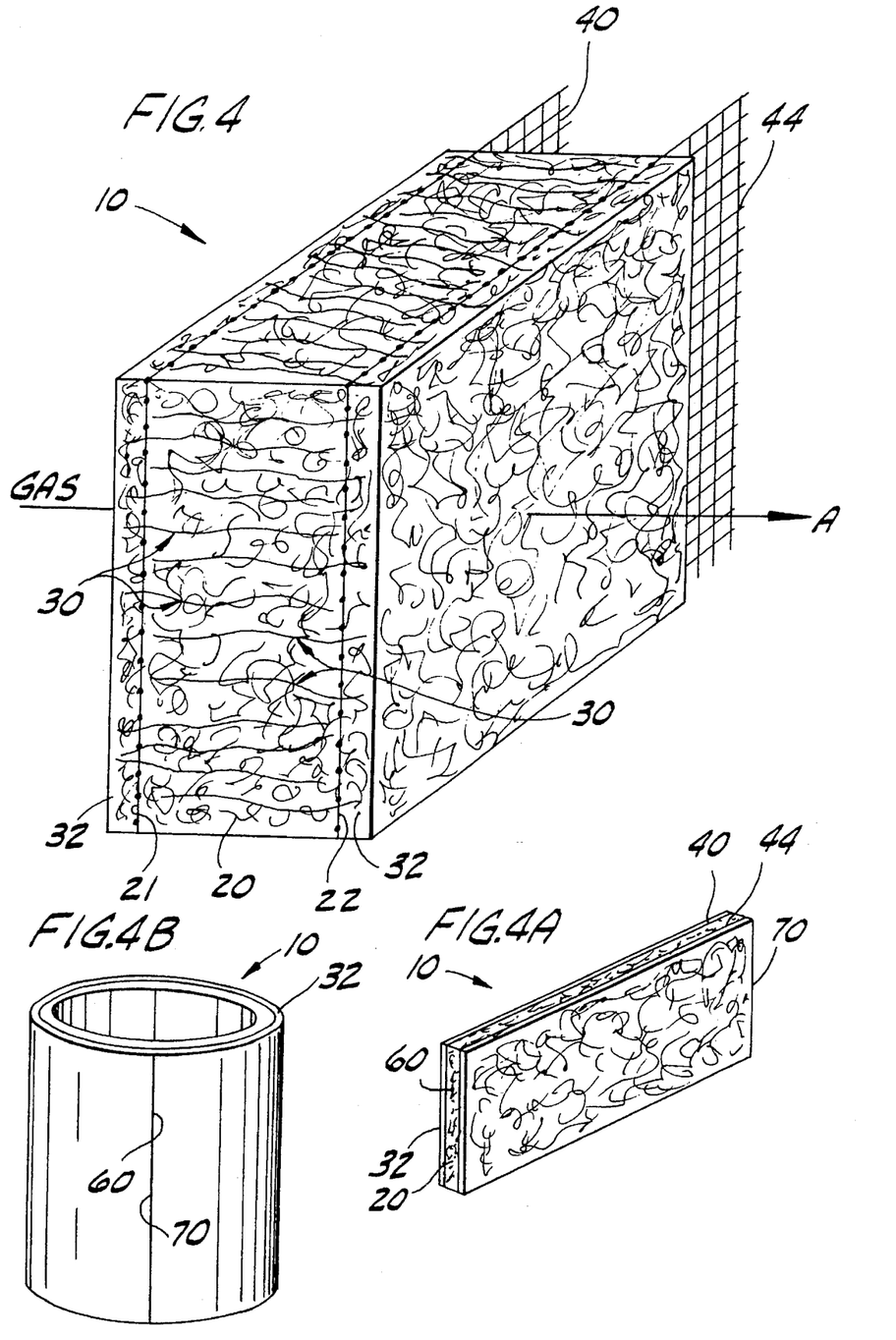
FIG. 4 is a fragmentary perspective view of a flat fiber bed in accordance with another embodiment of the invention including scrims.
FIG. 4A is a non-fragmentary perspective view of the flat fiber bed shown in FIG. 4.
FIG. 4B is a perspective view of the fiber bed shown in FIG. 4A in cylindrical configuration.

FIG. 4 is a fragmentary perspective view of a flat mat 10 in accordance with another embodiment of the invention. Mat 10 of FIG. 4 comprises all of the previously described components of the mat shown in FIG. 3 and further comprises a first scrim 40 and a second scrim 44. The scrims 40 and 44 are disposed such that the scrims are adjacent to the first face 21 and the second face 22 of the collecting fiber layer 20, respectively.

The scrims 40 and 44 are comprised of screen-like woven material and are shown in FIG. 4 extending beyond mat 10 to reveal this structure. The scrims 40 and 44 enhance the mechanical stability of the mat by preventing significant migration of the fibers of the collecting fiber layer 20 when exposed to the forces exerted by the moving gas stream. Furthermore, the scrims 40 and 44 improve the textile qualities of mat 10 by enhancing the strength of the mat in the plane perpendicular to the direction of gas flow. This enhanced strength allows mat 10 to be processed and manipulated more easily after assembly such as in pattern cutting, sewing and field replacement of the mat, and also prevents the mat from tearing due to the weight exerted by captured liquid when the mat is substantially vertical.

Preferably, the scrims 40 and 44 are style number I9712 commercially available from BFG Industries which is a 1.3 oz/yd$^2$ scrim made from Owens Corning Fiberglass S2 (acid resistant) glass fiber woven into a lock weave with approximately 8×8 visual threads per inch (i.e., approximate ⅛ by ⅛ inch openings). However, it should be appreciated that the scrims 40 and 44 can be varied substantially with regard to material, weaving style and openings per inch and still function quite satisfactorily. Furthermore, the scrims 40 and 44 may be coated with starch or other coating so that the integrity of the scrims is maintained during assembly of mat 10 and subsequent processing.

In order to incorporate the scrims 40 and 44 into mat 10 as shown in FIG. 4, the scrims may be placed between the collecting fiber layer 20 and the web which serves as the source of stabilizing fibers 30 prior to assembly of the mat and the introduction of the stabilizing fibers into the collecting fiber layer. As a result of the process of displacing fibers from the source web into the collecting fiber layer 20 to form the stabilizing fibers 30, the stabilizing fibers 30 pass through the scrims 40 and 44 and attach the scrims to the faces of the collecting fiber layer. The presence of residual fiber webs 32, as shown in FIG. 4, may help to insure that the scrims remain attached to the collecting fiber layer 20. Alternatively, a scrim can be incorporated in mat 10 by placing the scrim between adjacent batts of the material used to comprise the collecting fiber layer 20 prior to the introduction of the stabilizing fibers 30 such that when the mat is assembled, the stabilizing fibers 30 pass through the scrim layer.

Although mat 10 shown in FIG. 4 comprises two scrims 40 and 44, either of the scrims or both may be eliminated. However, eliminating one or both of the scrims 40 and 44 reduces mechanical stability and detracts from the textile qualities of mat 10 and is therefore less preferred. If one of the scrims 40 or 44 is eliminated from the embodiment shown in FIG. 4, it is preferred that the remaining scrim be positioned downstream of the collecting fiber layer 20 so as to better retain the fibers of the collecting fiber layer.

In a process for removing aerosols from a moving gas stream utilizing mat 10 as shown in FIG. 4, the gas to be treated is caused to enter the mat and flow through the first scrim 40 into the collecting fiber layer 20. Liquid aerosols and soluble solids in the gas are captured by the fibers which comprise the collecting fiber layer 20. The captured aerosols coalesce on the fibers to form droplets which are urged toward the second scrim 44 by the drag force of the moving gas and pulled downward by the force of gravity. The stabilizing fibers 30 disposed interstitially within the collecting fiber layer 20 prevent the forces exerted by the moving stream of gas and the captured and draining liquid from substantially shifting the fibers of the collecting fiber layer. After flowing through the second scrim 44, the treated gas exits mat 10 while the captured liquid drains from the bottom of the mat.

FIG. 4A is a non-fragmentary perspective view of the flat mat 10 shown in FIG. 4. The textile qualities of mat 10 of the present invention allow the mat to be easily manipulated into a variety of desired configurations after assembly. For example, a cylindrically configured fiber bed may be formed by flexing mat 10 shown in FIG. 4A so that an edge 60 is adjacent an opposite edge 70. The edge 60 and the opposite edge 70 may then be fixed relative to one another to form a fiber bed in the form of a cylinder or tube as shown in perspective in FIG. 4B. In FIG. 4B, a residual fiber web 32 forms the exterior surface of the cylindrical fiber bed. In forming the cylindrical fiber bed shown in FIG. 4B, the edge 60 and the opposite edge 70 may be joined, either in abutting or overlapping relation. A variety of techniques may be used to easily join the edges 60 and 70, including sewing or using a zipper, hook and loop or other fasteners.

Figure 5:
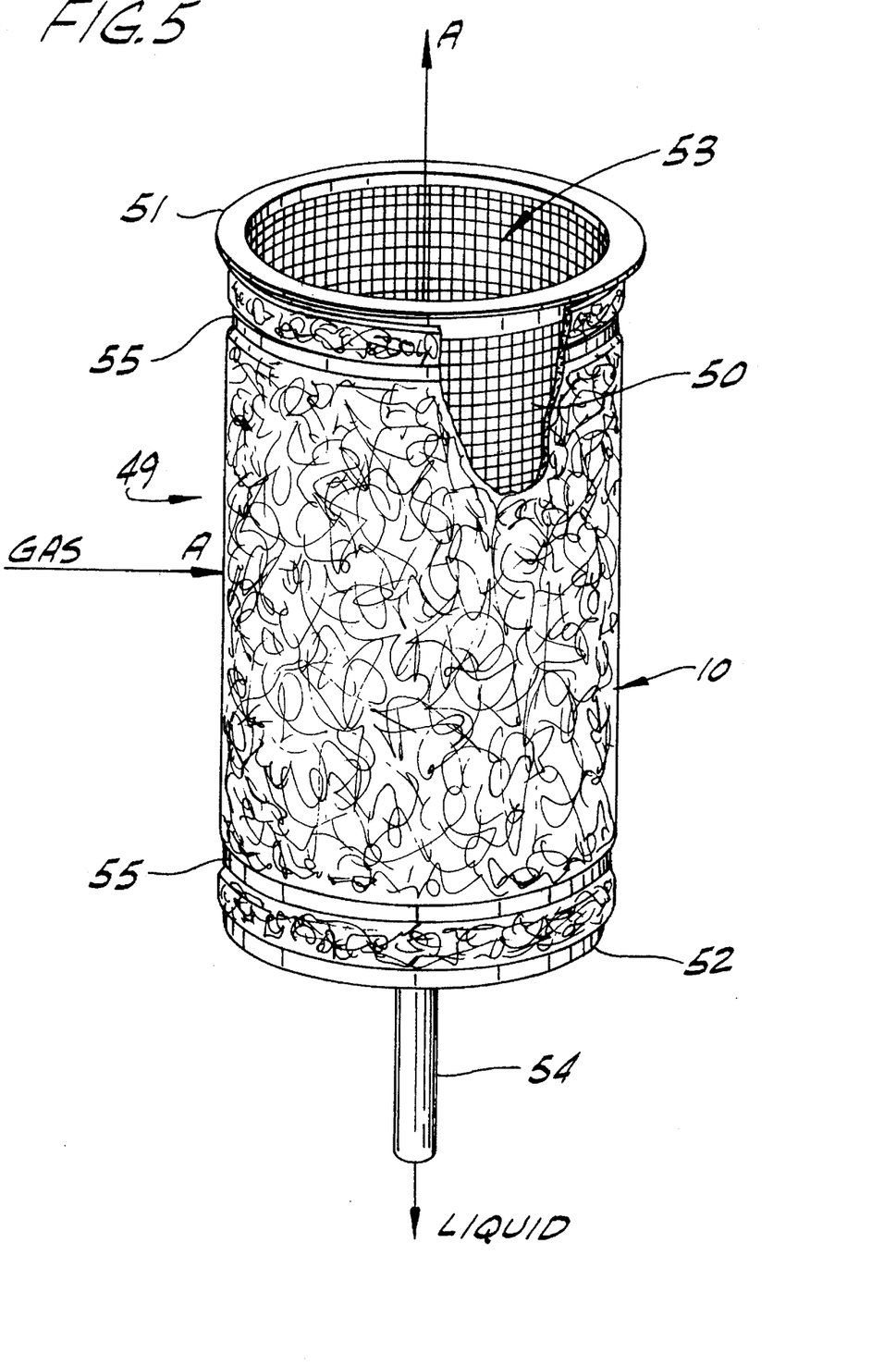
FIG. 5 is perspective view of a fiber bed element in accordance with the invention.

In FIG. 5, a fiber bed element 49 of the present invention is shown in cylindrical configuration comprising a mat 10 as previously described and shown in FIG. 4B in combination with appropriate external support structure. The external support structure comprises a fiber bed support 50 shown in FIG. 4 as a cylindrical wire cage. In the cylindrically configured fiber bed element 49, the fiber bed support 50 is connected to both a mounting flange 51 and an end cap 52. The mounting flange 51 has a gas opening 53. A conduit means 54, in fluid communication with an aperture (not shown) in the end cap 52, drains collected liquid from the fiber bed element 49.

When constructing the fiber bed element 49 and when replacing the fiber bed in the field, an assembled, tube-shaped mat 10, as shown in FIG. 4B, is pulled over the fiber bed support 50. Mat 10 is held securely to the fiber bed support 50 by fiber bed securing means 55 shown in FIG. 5 as clamping bands. In FIG. 5, a portion of mat 10 and the securing means 55 have been broken away to expose the fiber bed support 50. The fiber bed element 49, like bulk-packed and wound fiber bed elements, may be installed by connecting the mounting flange 51 to a tube sheet within the housing of a fiber bed mist eliminator.

The direction of gas flow through the fiber bed element 49 as indicated in FIG. 5 is sometimes called "forward flow." That is, the gas to be treated enters the fiber bed element 49 through mat 10 and treated gas exits the fiber bed element 49 through the gas opening 53 of the mounting flange 51. It should be appreciated that with appropriate changes in the support structure of the fiber bed element 49 as might be required, the fiber bed of the present invention can also be employed in a cylindrically configured fiber bed element which uses "reverse flow" (i.e., gas to be treated enters the fiber bed element 49 through the gas opening 53 of the mounting flange 51 and treated gas exits the fiber bed element 49 through mat 10).

Whether forward or reverse flow is employed, the external support structure of the fiber bed element 49 is considerably reduced in extent and substantiality as compared to the support structure used with bulk-packed or wound fiber beds of the prior art. For example, the fiber bed does not require an outer containment means such as a wire screen to hold the fibers in compression against the fiber bed support 50 so as to maintain the fiber bed density necessary to provide mechanical stability in the fiber bed. Furthermore, the fiber bed support 50 does not have to bear the forces exerted by bulk fiber under compression nor the forces exerted by the roving in the manufacture of a wound fiber bed. The fiber bed support 50 need only be substantial enough to maintain the shape of mat 10 under forward flow conditions as shown in FIG. 5 so as to prevent the mat 10 from collapsing. If reverse flow is used with the fiber bed element 49, a relatively insubstantial outer containment means such as netting may be employed to prevent mat 10 from billowing.

Although the fiber bed element 49 shown in FIG. 5 is in cylindrical configuration, it should be appreciated by those skilled in the art that with appropriate modifications in the fiber bed support 50 and the fiber bed securing means 55 a variety of configurations are possible. For example, mat 10 of the present invention may be used in a flat fiber bed element comprising a fiber bed support in the form of a flat screen and a fiber bed securing means in the form of molding fixed about the periphery of the screen for holding the fiber bed to the support. However, regardless of the configuration employed, the support structure used in combination with mat 10 is similarly reduced and simplified at a considerable cost savings while enhancing field replaceability.

In addition to the external support structure of a fiber bed element, mat 10 is used in conjunction with appurtenant apparatus which comprises the remainder of a fiber bed mist eliminator. Such apparatus, which may include housing, piping etc., is adapted to direct a gas to be treated through a fiber bed element and to drain off the collected aerosol in liquid form. In the removal of soluble solid particulates, this apparatus may further include means for dissolving the solids in a liquid, such as a fogging spray injected into the gas stream prior to reaching the fiber bed element. This appurtenant apparatus is well-known in the art. Furthermore, installation of fiber bed elements in such apparatus is also well-known and the practice is no different with respect to an element containing the fiber bed of this invention.

In FIG. 5, the fiber bed element 49 is shown positioned vertically and the flow of gas entering the fiber bed element 49 is horizontal. In actual practice, neither the fiber bed element 49 nor the gas flow need be totally vertical nor horizontal, respectively. In fact, gas flow in actual operation can vary substantially from horizontal just so long as the general direction of gas flow is from one face of the collecting fiber layer 20 to the other face thereof. It will also be obvious to those skilled in the art that the fiber bed element 49 need only be disposed substantially vertically without seriously affecting the practice of this invention.

Figure 6:
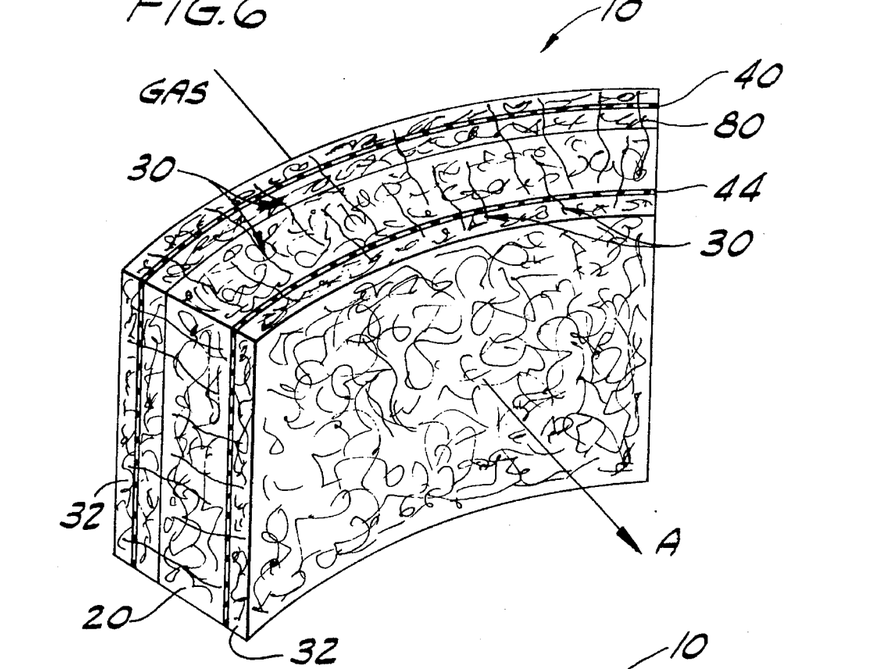
FIG. 6 is a fragmentary perspective view of a cylindrically configured fiber bed in accordance with another embodiment of the invention including a preliminary filtration layer.

Mat 10 of the present invention may comprise additional functional layers depending upon the particular fiber bed mist eliminator application. For example, in some applications, large solid contaminates in the gas to be treated may "skin" or block the collecting fiber layer 20 of mat 10 which may cause premature pluggage and increased pressure drop. FIG. 6 is a fragmentary perspective view of a cylindrically configured mat 10 in accordance with another embodiment of the invention including a preliminary filtration layer 80 designed to reduce these skinning effects. In use, the preliminary filtration layer 80 is positioned upstream of the collecting fiber layer 20 and may be, for example, as shown in FIG. 6, interposed between and in face-to-face relation with both the first scrim 40 and the collecting fiber layer 20. The preliminary filtration layer 80 is comprised of fiber material having average fiber diameters ranging from about 8 μm to about 50 μm and may be made from any of the various fiber materials described herein, including glass, polypropylene etc. Some of the stabilizing fibers 30 penetrate through the preliminary filtration layer 80. In operation, the preliminary filtration layer 80 removes larger contaminants from the gas stream and prevents them from blocking the face of the collecting fiber layer 20. Suitable material to use as preliminary filtration layer 80 includes glass fibers sold under the product designation G300 having an average fiber diameter of about 10 μm and which is commercially available from Schuller Corporation, Denver, Colo.

Figure 7:
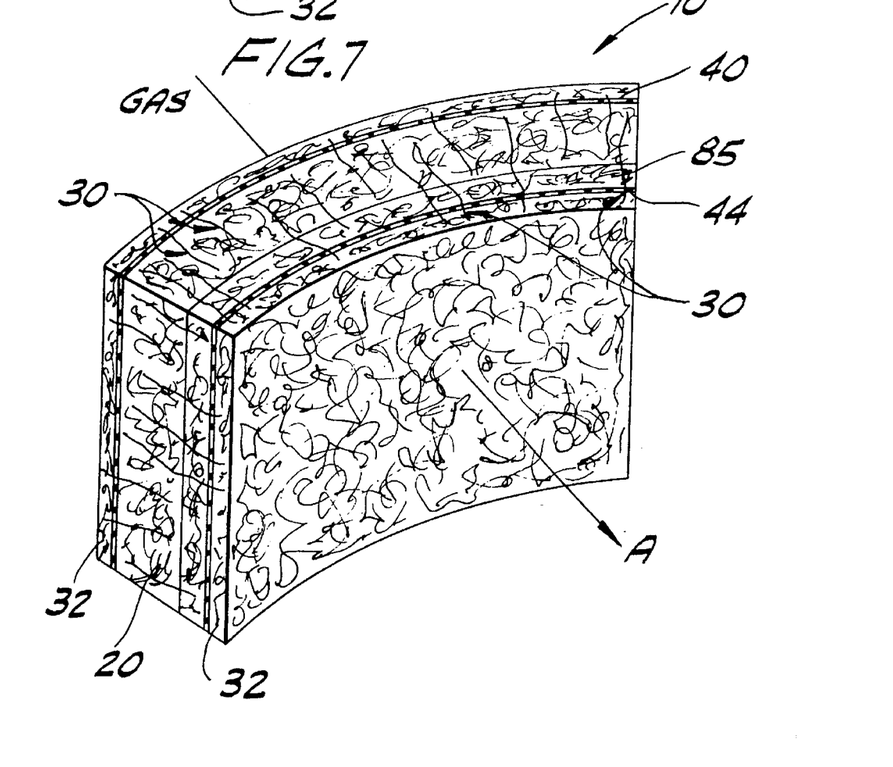
FIG. 7 is a fragmentary perspective view of a cylindrically configured fiber bed in accordance with another embodiment of the invention including a reentrainment layer.

As noted previously, reentrainment of captured liquid by the gas stream as it moves through a fiber bed reduces separation efficiency. FIG. 7 is a fragmentary perspective view of a cylindrically configured mat 10 in accordance with another embodiment of the invention including a reentrainment layer 85 designed to reduce the adverse effects of reentrainment on separation efficiency. In use, the reentrainment layer 85 is positioned downstream of the collecting fiber layer 20 and may be, for example, as shown in FIG. 7, interposed between and in face-to-face relation with both the second scrim 44 and the collecting fiber layer 20. The reentrainment layer 85 is comprised of fiber material having average fiber diameters ranging from about 20 μm to about 100 μm and, like the preliminary filtration layer 80, may be made from any of the various fiber materials described herein, including glass, polypropylene etc. Some of the stabilizing fibers 30 penetrate through the reentrainment layer 85. Alternatively, the reentrainment layer 85 may be disposed in face-to-face relation with the residual web 32 and be made a part of mat 10 by conventional sewing. Droplets of collected liquid which are reentrained by the flowing gas are recaptured by the fibers of the reentrainment layer 85. Recaptured droplets are urged through the reentrainment layer 85 by the flowing gas and forced to drain downwardly by the force of gravity.

In view of the preceding disclosure, it should be appreciated that the mat constructed in accordance with the present invention successfully utilizes fibers having an average fiber diameter between about 1 μm and about 5 μm. By utilizing smaller diameter fibers, the mat may be thinner than a conventional bulk-packed or wound fiber bed for a particular application and desired separation efficiency. The thinner mats offer several advantages including improved field replaceability due to the reduction in bulk. It should also be appreciated that the thinner mat may be configured (e.g., cylinders having reduced diameters) so as to increase the effective fiber bed surface area and thereby increase the process capacity for a given mist eliminator volume or reduce the pressure drop across the mist eliminator. Finally, it should be appreciated that the textile qualities of the mat and the reduction in the external support structure of the fiber bed elements enhance the field replaceability of the fiber bed and reduce the cost of the required support structure.

In view of the above, it will be seen that the several objects of the invention are achieved and other advantageous results attained. As various changes could be made in the above constructions without departing from the scope of the invention, it is intended that all matter contained in the above description, shown in the accompanying drawings or set forth in the following example shall be interpreted as illustrative and not in a limiting sense.

EXAMPLE

The performance of a fiber bed in accordance with the present invention was compared to the performance of a bulk-packed fiber bed and a wound fiber bed under similar operating conditions. Each fiber bed was tested in a cylindrically configured fiber bed element using reverse flow.

The fiber bed in accordance with the present invention used in this example was a combination of two such fiber beds in series. Each of these two fiber beds contained the components shown in the fiber bed of FIG. 6. The fiber bed combination used in this example was formed by positioning the two fiber beds adjacent one another such that the residual web of each fiber bed opposite the collecting fiber layer from the preliminary filtration layer were in face-to-face contact. Two fiber beds were combined in this manner in order to provide increased separation efficiency. However, it should be understood that increased separation efficiency could have alternatively been achieved by increasing the quantity of fiber used in the collecting fiber layer of a single fiber bed constructed in accordance with the present invention.

Once the two fiber beds were positioned in combination as previously described, the fiber bed combination was formed into a cylinder by flexing the combination so as to bring opposite edges in contact. The combination was maintained in cylindrical configuration during performance testing within a fiber bed element comprising suitable external support structure.

The collecting fiber layers of the two fiber beds used in the fiber bed combination comprised batts of fiber glass filament B010 having an average fiber diameter of about 3.5 µm. The stabilizing fibers were a blend of tetrafluoroethylene polymer fibers and polypropylene fibers such that the weight ratio of the former to the latter was about 4:1. The two scrims included in each of these two fiber beds were open weave fiber glass scrims with approximately 8×8 visual threads per inch. The preliminary filtration layer was comprised of fiber glass filament G300. The two fiber beds were separately assembled into mat form using the double acting loom needle-punching process described in U.S. Pat. No. Re. 33,023. In this manner, stabilizing fibers originating from the two residual webs of each of the fiber beds were caused to penetrate into the collecting fiber layer and be disposed interstitially therein. After assembly, each of these two fiber beds were approximately 0.6 inch thick. Thus, the overall thickness of the fiber bed combination was 1.2 inches. The fiber bed combination had a bulk density of about 7.5 lb/ft$^3$, a void fraction of about 0.95, a fiber specific surface area of about 1163 in$^2$/in$^3$ and NCT of about 1396.

The bulk-packed fiber bed used in this example was comprised of glass fibers having an average fiber diameter of 8.0 µm. The bulk fiber was packed between two cylindrical, opposing support screens to form the fiber bed element used in this example. The bulk-packed fiber bed was 3 inches thick, had a bulk density of about 14.17 lb/ft$^3$, a void fraction of about 0.91, a fiber specific surface area of about 1135 in$^2$/in$^3$ and NCT of about 3405.

The wound fiber bed used in this example was comprised of glass fibers having an average fiber diameter of 8.0 µm which were formed into a roving and wound upon a cylindrical support screen. The wound fiber bed was 2.83 inches thick, had a bulk density of about 11.61 lb/ft$^3$, a void fraction of about 0.93, a fiber specific surface area of about 932 in$^2$/in$^3$ and NCT of about 2638. Summarized in Table I are the characteristics of each of the three fiber beds.

The three fiber beds were tested in a pilot plant set-up using a corn oil aerosol entrained in an air stream as the gas to be treated. Summarized in Table II are the operating conditions, pressure drop and measured separation efficiencies for each of the three fiber beds tested. The separation efficiencies were measured using a condensation particle counter (CPC), model No. 3022 made by TSI, St. Paul, Minn.

Also included in the Table below is the average Figure of Merit for each of the three fiber beds tested. The Figure of Merit is quality factor useful in comparing the relative performance of filters and is defined as follows:

$$\text{Figure of Merit} = -\frac{\ln(1 - \text{separation efficiency})}{\text{pressure drop}}$$

As is evident, the Figure of Merit increases as separation efficiency increases and decreases with increased pressure drop. Thus, the higher the Figure of Merit the better the overall performance of the fiber bed with respect to these two criteria.

As can be seen in the Table below, the fiber bed combination of the present invention achieved separation efficiencies in excess of 99% with respect to each of the particle diameters measured. The bulk-packed and wound fiber beds achieved slightly greater separation efficiencies through the same range of particle diameters. However, the mist loading used in testing the bulk-packed fiber bed and the wound fiber bed was lower than that used in testing the fiber bed combination. Furthermore, the average Figure of Merit attained by the fiber bed combination of the present invention exceeded that of the bulk-packed fiber bed and was comparable to that of the wound bed.

TABLE I

Bed Characteristic Summary

| Bed Type | Avg. Fiber Diameter (µm) | Bulk Density (lb/ft$^3$) | Void Fraction | Spec. Fiber Surface Area (in$^2$/in$^3$) | Bed Thickness (in) | NCT |
|---|---|---|---|---|---|---|
| Bulk-Packed | 8 | 14.27 | 0.91 | 1135 | 3.0 | 3405 |
| Wound | 8 | 11.61 | 0.93 | 932 | 2.83 | 2638 |
| Mat Combination | 3.5 | 7.5 | 0.95 | 1163 | 1.20 | 1396 |

TABLE II

Performance Summary
Test Aerosol: Corn Oil

| Bed Type | Mist Loading (mg/a m$^3$) | Bed Velocity (ft/min) | Pressure Drop (in H$_2$O) | Separation Efficiency at Various Particle Diameters (µm) | | | | | Ave. Figure of Merit |
|---|---|---|---|---|---|---|---|---|---|
| | | | | 0.30 | 0.65 | 1.20 | 1.95 | 3.05 | |
| Bulk-Packed | 1707 | 26.5 | 16.97 | 99.69 | 99.83 | 99.96 | 99.96 | 100.0 | 0.41 |
| Wound | 1186 | 29.0 | 16.22 | 99.85 | 99.95 | 99.99 | 99.96 | 100.0 | 0.48 |
| Mat Combination | 2309 | 28.0 | 14.02 | 99.10 | 99.71 | 99.98 | 99.93 | 100.0 | 0.47 |

What is claimed is:

1. A field-replaceable fiber bed for use in a fiber bed mist eliminator for removing aerosols and soluble solids from a moving gas stream, the fiber bed in the form of a flexible mat having a void fraction exceeding about 0.89 and in excess of about 700 net collection targets, the mat comprising:

a layer of collecting fibers having an average fiber diameter between about 1 μm and about 5 μm, the collecting fiber layer having a first face and a second face; and a plurality of stabilizing fibers for positionally stabilizing the collecting fibers of the mat, the stabilizing fibers penetrating into and disposed interstitially within the collecting fiber layer such that the stabilizing fibers extend into the collecting fiber layer in the thickness direction thereof and in a direction generally parallel to the direction of gas flow through the mat, the number of stabilizing fibers and the extent to which the stabilizing fibers penetrate into the collecting fiber layer being sufficient so that the collecting fibers are mechanically stable under design operating conditions.

2. The fiber bed of claim 1 wherein the stabilizing fibers have a larger average fiber diameter than the collecting fibers such that the ratio of the average fiber diameter of the stabilizing fibers to the average fiber diameter of the collecting fibers is at least about 2:1.

3. The fiber bed of claim 2 wherein the collecting fibers comprise glass fibers.

4. The fiber bed of claim 3 wherein the glass fibers comprise fibers ranging in diameter from about 0.3 μm to about 15 μm.

5. The fiber bed of claim 3 wherein the stabilizing fibers comprise a mixture of tetrafluoroethylene polymer fibers and other polymeric fibers made of material selected from polypropylene, polyester or nylon.

6. The fiber bed of claim 5 wherein the weight ratio of the tetrafluoroethylene polymer fibers disposed interstitially within the collecting fiber layer to the other polymeric fibers disposed interstitially within the collecting fiber layer is between about 2:1 and about 5:1.

7. The fiber bed of claim 2 wherein the collecting fibers comprise polymeric fibers.

8. The fiber bed of claim 7 wherein the collecting fibers comprise polymeric fibers selected from the group consisting of polypropylene fibers and polyester fibers.

9. The fiber bed of claim 1 wherein the mat further comprises a scrim.

10. The fiber bed of claim 9 wherein the scrim is disposed within the collecting fiber layer, the stabilizing fibers passing through the scrim.

11. The fiber bed of claim 9 wherein the scrim is disposed adjacent to a face of the collecting fiber layer, the stabilizing fibers passing through the scrim.

12. The fiber bed of claim 1 wherein the mat further comprises a preliminary filtration layer positioned upstream of the collecting fiber layer relative to the direction of gas flow through the mat.

13. The fiber bed of claim 12 wherein the preliminary filtration layer is comprised of fiber material having an average fiber diameter ranging from about 8 μm to about 50 μm.

14. The fiber bed of claim 1 wherein the mat further comprises a reentrainment layer positioned downstream of the collecting fiber layer relative to the direction of gas flow through the mat.

15. The fiber bed of claim 14 wherein the reentrainment layer is comprised of fiber material having an average fiber diameter ranging from about 20 μm to about 100 μm.

16. The fiber bed of claim 3 further comprising a scrim and a preliminary filtration layer, the stabilizing fibers passing through the scrim and the preliminary filtration layer.

17. A fiber bed element for use in a fiber bed mist eliminator, the fiber bed element comprising the field-replaceable fiber bed as set forth in claim 1, a fiber bed support and a fiber bed securing means.

* * * * *